United States Patent
Konishi et al.

(10) Patent No.: US 11,094,194 B2
(45) Date of Patent: Aug. 17, 2021

(54) OPERATION MANAGEMENT SYSTEM AND OPERATION MANAGEMENT PROGRAM

(71) Applicant: AISIN AW CO., LTD., Anjo (JP)

(72) Inventors: Yasutaka Konishi, Okazaki (JP);
Yoichi Yamamura, Okazaki (JP);
Hideki Kasezawa, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 216 days.

(21) Appl. No.: 16/174,770

(22) Filed: Oct. 30, 2018

(65) Prior Publication Data

US 2019/0156672 A1    May 23, 2019

(30) Foreign Application Priority Data

Nov. 17, 2017  (JP) .............................. JP2017-221429

(51) Int. Cl.
| G08G 1/13 | (2006.01) |
|---|---|
| G01C 21/36 | (2006.01) |
| G08G 1/00 | (2006.01) |
| G01S 19/13 | (2010.01) |

(52) U.S. Cl.
CPC ............ *G08G 1/13* (2013.01); *G01C 21/3697* (2013.01); *G08G 1/20* (2013.01); *G01S 19/13* (2013.01)

(58) Field of Classification Search
CPC ........ G08G 1/13; G08G 1/20; G01C 21/3697; G01S 19/13
See application file for complete search history.

(56) References Cited

U.S. PATENT DOCUMENTS

| 9,041,553 | B2 | 5/2015 | Sako et al. | |
|---|---|---|---|---|
| 9,625,266 | B1* | 4/2017 | Chintakindi | ....... G01C 21/3691 |
| 9,657,988 | B1* | 5/2017 | Horinek | ................ F26B 19/005 |
| 2007/0138347 | A1* | 6/2007 | Ehlers | .............. G08G 1/096844 |
| | | | | 246/1 R |
| 2009/0287405 | A1* | 11/2009 | Liu | ......................... G01C 21/20 |
| | | | | 701/119 |
| 2010/0088163 | A1* | 4/2010 | Davidson | ................. G07C 5/02 |
| | | | | 340/425.5 |
| 2013/0151133 | A1* | 6/2013 | Kickbusch | .......... B61L 27/0027 |
| | | | | 701/117 |
| 2013/0214940 | A1 | 8/2013 | Sako et al. | |
| 2014/0136025 | A1* | 5/2014 | Cooper | .................... G08G 9/00 |
| | | | | 701/2 |
| 2018/0081374 | A1* | 3/2018 | Nimchuk | ............... G06Q 10/02 |
| 2018/0136003 | A1* | 5/2018 | Perkins | ................ G01C 21/362 |
| 2018/0188057 | A1* | 7/2018 | Fukuda | .............. G01C 21/3655 |
| 2019/0072398 | A1* | 3/2019 | Balakrishna | ........ G01C 21/3492 |
| 2020/0400459 | A1* | 12/2020 | Chintakindi | ....... G01C 21/3461 |

FOREIGN PATENT DOCUMENTS

| JP | 2003-104559 A | 4/2003 |
|---|---|---|
| JP | 2003-128252 A | 5/2003 |
| JP | 2013-129510 A | 7/2013 |
| JP | 2013-168065 A | 8/2013 |

* cited by examiner

*Primary Examiner* — Behrang Badii
(74) *Attorney, Agent, or Firm* — Oliff PLC (57) ABSTRACT

Operation management systems, methods, and programs obtain a travel plan including a scheduled point and a scheduled time associated with the scheduled point, and obtain a travel track record including a travel point of a vehicle and a travel time associated with the travel point. The systems, methods, and programs obtain, when a delay has occurred in the travel plan, a cause of the delay based on the travel track record and the travel plan, and output the obtained cause of the delay.

14 Claims, 6 Drawing Sheets

OPERATION MANAGEMENT SYSTEM AND OPERATION MANAGEMENT PROGRAM

INCORPORATION BY REFERENCE

The disclosure of Japanese Patent Application No. 2017-221429, filed on Nov. 17, 2017, including the specification, drawings and abstract is incorporated herein by reference in its entirety.

BACKGROUND

Related technical fields include operation management systems and an operation management programs.

In freight transport, etc., there is a case in which a vehicle needs to arrive at a scheduled point on time or to depart from the scheduled point on time. There is known a technique for preventing the occurrence of schedule delay when a schedule is thus determined. For example, JP 2003-104559 A discloses a technique in which a scheduled arrival time is calculated and when the scheduled arrival time exceeds a specified collection time, it is determined that there is a delay. In addition, JP 2003-104559 A discloses that when a delay is detected, a plan for requesting another vehicle for alternative transport is calculated.

SUMMARY

In the conventional technique disclosed in JP 2003-104559 A, when a delay has occurred, a cause of the delay has not been able to be identified. Therefore, when a delay has occurred, measures cannot be taken by planning improvement measures against the delay. Hence, in the conventional technique, the recurrence of delays cannot be prevented and it is difficult to perform management such that a vehicle is operated as scheduled.

Exemplary embodiments of the broad inventive principles described herein address the above-described problem and have an object to provide a system that obtains a cause of delay.

Exemplary embodiments provide operation management systems, methods, and programs that obtain a travel plan including a scheduled point and a scheduled time associated with the scheduled point, and obtain a travel track record including a travel point of a vehicle and a travel time associated with the travel point. The systems, methods, and programs obtain, when a delay has occurred in the travel plan, a cause of the delay based on the travel track record and the travel plan, and output the obtained cause of the delay.

That is, exemplary embodiments collect a travel track record of a vehicle, and obtain and output a cause of delay based on the travel track record and a travel plan. Hence, a system can be provided that obtains and outputs a cause of delay without based on, for example, input by a human such as a vehicle driver. Therefore, when a delay has occurred, an operation manager can securely understand a cause of the delay. Exemplary embodiments provide operation management systems, methods, and programs that obtain a travel track record including a travel point of a vehicle and a travel time associated with the travel point, and determine, based on the travel track record, whether a departure time from a scheduled point is later than a scheduled time having been scheduled. The systems, methods, and programs determine a cause of delay to be departure delay when it is determined that the departure time from the scheduled point is later than the scheduled time having been scheduled, and output the determined cause of delay.

Namely, by analyzing a departure time based on a travel track record, when the departure time is later than a scheduled time, a cause of delay being departure delay can be obtained.

DETAILED DESCRIPTION OF EXEMPLARY EMBODIMENTS

Figure 1:
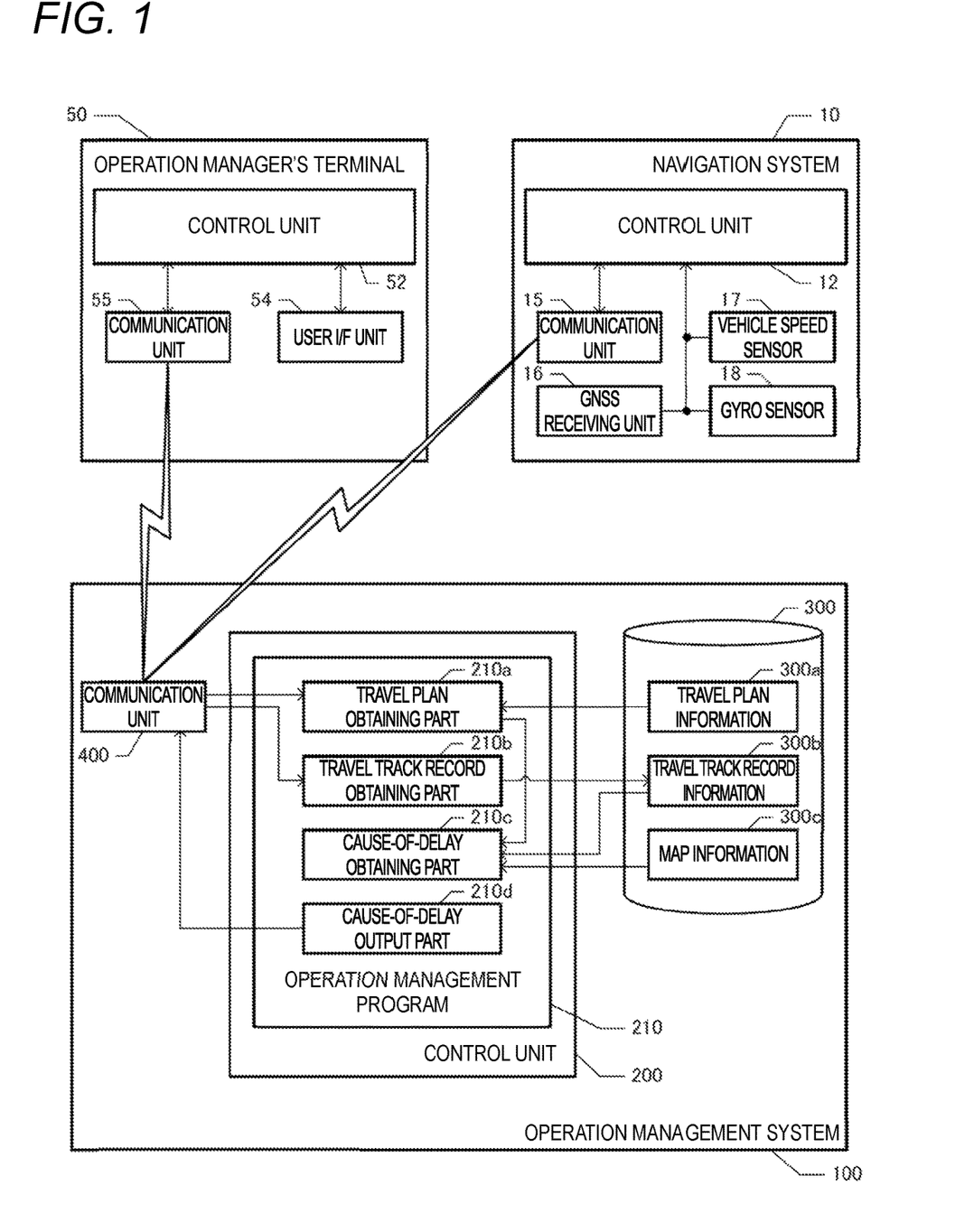
FIG. 1 is a block diagram of an operation management system.

Here, exemplary embodiments will be described below in the following order:
(1) System configuration;
(1-1) Configuration of the navigation system;
(1-2) Configuration of the operation management system;
(1-3) Configuration of the operation manager's terminal
(2) Process of determining whether there is a delay;
(3) Process of determining a cause of delay;
(4) Examples of output; and
(5) Other embodiments.
  (1) System Configuration FIG. 1 is a block diagram showing a configuration of an operation management system 100. In the present embodiment, the operation management system 100 is used to deliver goods as planned by a plurality of delivery vehicles. In the present embodiment, the operation management system 100 cooperates with navigation systems 10 used by delivery vehicles and an operation manager's terminal 50. The operation manager's terminal 50 is a terminal used by an operation manager who performs operation management of a plurality of delivery vehicles, and one or more terminals are installed, for example, at a delivery company's location, etc. The navigation systems 10 are used by the plurality of delivery vehicles, respectively, and may be mounted on the delivery vehicles, or a portable terminal may be carried in a delivery vehicle and used.
  (1-1) Configuration of the Navigation System The navigation system 10 according to the present embodiment is a terminal for providing guidance for guiding a delivery vehicle along a scheduled travel route. In the present embodiment, a travel plan is determined in advance and agreed by the operation manager and shippers of goods. The navigation system 10 can perform a function of guiding the delivery vehicle according to the travel plan.

The travel plan is set by scheduled points and scheduled times associated with the scheduled points. In the present embodiment, the travel plan also includes a scheduled travel route between the scheduled points. The scheduled points are any of the departure point, stopover point, and final destination point of the delivery vehicle. At each point, either one or both of loading and unloading of goods (hereinafter, referred to as loading and unloading) is (are) performed.

The navigation system 10 includes a control unit 12 including a CPU, a RAM, a ROM, etc., a recording medium which is not shown, a communication unit 15, a GNSS receiving unit 16, a vehicle speed sensor 17, and a gyro sensor 18. (As used herein, the term "recording medium" does not encompass transitory signals.) The control unit 12 can execute a navigation program (not shown) which is stored in the recording medium (not shown) or the ROM.

The recording medium which is not shown records information indicating a travel plan and map information. The map information is information used to identify the location of the delivery vehicle or a guidance-target facility. The map information includes, for example, node data representing the locations of nodes set on a road on which the delivery vehicle travels, etc.; shape interpolation point data representing the locations of shape interpolation points for identifying the shape of a road between the nodes, etc.; link data representing a link between the nodes; data representing the locations of ground objects present on the road or around the road, etc. Data representing a ground object is associated with an attribute of the ground object. The attribute of the ground object includes the type of facility (e.g., a delivery location or a break point).

The GNSS receiving unit 16 is an apparatus that receives signals from the Global Navigation Satellite System. The GNSS receiving unit 16 receives radio waves from navigation satellites, and outputs a signal for calculating a current location of the delivery vehicle, through an interface which is not shown. The control unit 12 obtains this signal to obtain the current location of the delivery vehicle. The vehicle speed sensor 17 outputs a signal corresponding to the rotational speed of wheels provided on the delivery vehicle. The control unit 12 obtains this signal through the interface which is not shown, to obtain a vehicle speed. The gyro sensor 18 detects angular acceleration for a turn in a horizontal plane of the delivery vehicle, and outputs a signal corresponding to the orientation of the delivery vehicle. The control unit 12 obtains this signal to obtain a traveling direction of the delivery vehicle. The vehicle speed sensor 17, the gyro sensor 18, and the like, are used to identify a traveling path of the delivery vehicle. In the present embodiment, a current location is identified based on the departure location and traveling path of the delivery vehicle, and the current location of the delivery vehicle identified based on the departure location and traveling path is corrected based on an output signal from the GNSS receiving unit 16.

The communication unit 15 includes a circuit that performs communication with other apparatuses. The control unit 12 can perform communication with the operation management system 100 through the communication unit 15. In addition, the control unit 12 can perform communication with a traffic information management system which is not shown, through the communication unit 15. The traffic information management system is a server that manages congestion levels for each road section, and transmits information indicating a requested congestion level of a road section in response to a request from the navigation system 10 or the operation management system 100.

The control unit 12 can provide, by a function of the navigation program which is not shown, route guidance that guides a driver of the delivery vehicle along a scheduled travel route, using an output unit of a user I/F unit which is not shown, based on the travel plan and map information. In addition, by a function of the navigation program, the control unit 12 performs communication with the traffic information management system through the communication unit 15 to obtain traffic information for the scheduled travel route.

The control unit 12 estimates time required to reach a next scheduled point from a current location, based on a congestion level indicated by the traffic information. Note that the time required can be estimated by, for example, estimating an average vehicle speed from the congestion level and calculating time required, based on a distance of a road section and the average vehicle speed. Then, the control unit 12 calculates an estimated arrival time at the scheduled point based on the time required, and allows the user I/F unit to display the estimated arrival time. As a result, a fulfillment level of the travel plan can be notified to the driver of the delivery vehicle.

In the above configuration, the control unit 12 transmits a travel track record of the delivery vehicle to the operation management system 100. In the present embodiment, the control unit 12 obtains a current location of the delivery vehicle every certain period (or certain distance) based on output signals from the GNSS receiving unit 16, the vehicle speed sensor 17, and the gyro sensor 18. Then, the control unit 12 generates information indicating a travel track record in which the current location is associated with a current time and identification information (e.g., a vehicle's license number) of the delivery vehicle, and transmits the travel track record to the operation management system 100 through the communication unit 15. As a result, the operation management system 100 can obtain travel track records in which travel times are associated with travel points of respective delivery vehicles and which are collected every certain period.

(1-2) Configuration of the Operation Management System

The operation management system 100 includes a control unit 200 including a CPU, a RAM, a ROM, etc., a recording medium 300, and a communication unit 400. The communication unit 400 includes a circuit that gives and receives information to/from the navigation system 10 and the operation manager's terminal 50. The control unit 200 can perform communication with the navigation system 10 and the operation manager's terminal 50 through the communication unit 400. In addition, the control unit 200 can execute a program stored in the recording medium 300 or the ROM by the control unit 200. In the present embodiment, as the program, an operation management program 210 can be executed.

In addition, the recording medium 300 records in advance travel plan information 300a indicating travel plans and map information 300c, and sequentially records travel track record information 300b indicating travel track records which are transmitted in the course of operation of delivery vehicles. Note that the travel plan information 300a is the same as the above-described travel plan which is recorded in the recording medium of the navigation system 10, and is set by scheduled points and scheduled times associated with the scheduled points, and also includes a scheduled travel route between the scheduled points.

Note, however, that the operation management system 100 records, in the recording medium 300, travel plans for all delivery vehicles which are operation management targets, as the travel plan information 300a. Therefore, the travel plan information 300a is configured to be associated with the identification information of delivery vehicles so that the travel plans for the respective delivery vehicles can be distinguished. Note that the travel plan information 300a may be configured in any manner as long as the travel plan information 300*a* is determined in advance and recorded in the recording medium 300. For example, a configuration can be adopted in which the operation manager transmits travel plan information 300*a* for each delivery vehicle to the operation management system 100 from the operation manager's terminal 50, and the travel plan information 300*a* is recorded in the recording medium 300.

The travel track record information 300*b* indicates a travel track record of each delivery vehicle which is transmitted from each delivery vehicle. Namely, the travel track record information 300*b* is information obtained by collecting, every certain period, a travel track record in which a travel time is associated with a travel point at which a delivery vehicle has traveled, and the travel track record information 300*b* is associated with the identification information of the delivery vehicle. The map information 300*c* is the same information as the map information recorded in the recording medium of the navigation system 10, and includes, for example, node data, shape interpolation point data, link data, data representing the locations of ground objects present on a road or around the road, etc. Data representing a ground object includes an attribute of the ground object (the type of facility, etc.).

In the present embodiment, the operation management program 210 includes a travel plan obtaining part 210*a*, a travel track record obtaining part 210*b*, a cause-of-delay obtaining part 210*c*, and a cause-of-delay output part 210*d*. The travel plan obtaining part 210*a* is a program module that allows the control unit 200 to perform a function of obtaining a travel plan including scheduled points and scheduled times associated with the scheduled points. In the present embodiment, since the travel plan information 300*a* is recorded in advance in the recording medium 300, the control unit 200 obtains a travel plan by referring to the recording medium 300.

Note that although, in the present embodiment, a determination as to whether a delay has occurred is made every certain period for all delivery vehicles, and when a delay has occurred, a cause of the delay is obtained, the determination as to whether a delay has occurred, obtaining of a cause of the delay, etc., may be performed for a specific delivery vehicle when necessary. In any case, by the function of the travel plan obtaining part 210*a*, the control unit 200 obtains travel plan information 300*a* of a determination-target delivery vehicle based on the identification information of the delivery vehicle.

The travel track record obtaining part 210*b* is a program module that allows the control unit 200 to perform a function of obtaining a travel track record including a travel point of a vehicle and a travel time associated with the travel point. Namely, by the function of the travel track record obtaining part 210*b*, the control unit 200 monitors the communication unit 400 and when a travel track record is transmitted from the navigation system 10, the control unit 200 obtains the travel track record through the communication unit 400 and records the travel track record as travel track record information 300*b* in the recording medium 300.

The cause-of-delay obtaining part 210*c* is a program module that allows the control unit 200 to perform a function of obtaining, when a delay has occurred in a travel plan, a cause of the delay based on travel track records and the travel plan. Since travel track records are a history of travel points and travel times of each delivery vehicle, the control unit 200 can identify time required to move to a travel point, based on the travel track records. A cause of delay is closely related to the behavior of a delivery vehicle at each travel point. At a given presence point, a cause of delay specific to another presence point does not occur. Hence, in the present embodiment, a configuration is adopted in which a vehicle's behavior for when a delay has occurred is identified in association with a point, and a cause of the delay is identified based on whether a specific behavior has been performed at a specific point.

Specifically, the control unit 200 communicates with the traffic information management system which is not shown, through the communication unit 400, and obtains a congestion level of a road section included in a scheduled travel route indicated by travel plan information 300*a*. In addition, the control unit 200 estimates an average vehicle speed from the congestion level and calculates time required, based on a distance of the road section and the average vehicle speed, and thereby obtains estimated time required to reach a next scheduled point from a current location. Furthermore, the control unit 200 calculates an estimated arrival time at the next scheduled point based on the estimated time required. Furthermore, the control unit 200 obtains a scheduled time associated with the next scheduled point based on the travel plan information 300*a*, and when the scheduled time is before the estimated arrival time, the control unit 200 determines that a delay has occurred.

When it is determined that a delay has occurred, the control unit 200 identifies a behavior for each travel point, based on travel track record information 300*b*. In the present embodiment, the control unit 200 identifies a behavior for when the travel point of the delivery vehicle is on a road, a behavior for when the travel point is a scheduled point, and a behavior for when the travel point is a break point.

Namely, when a delay has occurred while the delivery vehicle is traveling on a road, it is highly likely that a cause of the delay is a road situation. Hence, the cause-of-delay obtaining part 210*c* estimates time required on the road based on track records, and compares the estimated time required with time required on a plan. Specifically, the cause-of-delay obtaining part 210*c* obtains, based on travel track records, estimated time required when the delivery vehicle travels along a scheduled travel route of the delivery vehicle. Namely, the control unit 200 obtains estimated time required which is obtained when a determination as to whether a delay has occurred is made, as time required which is estimated based on track records.

Furthermore, the control unit 200 obtains scheduled time required when the delivery vehicle travels according to the travel plan, based on the travel plan information 300*a*. The scheduled time required can be obtained, for example, as follows. The control unit 200 obtains a difference between scheduled times associated with the last scheduled point from which the delivery vehicle has departed and a scheduled point to which the delivery vehicle is currently heading, as time required between the scheduled points. In addition, the control unit 200 obtains a remaining distance from a current point of the delivery vehicle to the next scheduled point, based on the scheduled travel route and the map information 300*c*. Furthermore, the control unit 200 obtains a distance between the scheduled points based on the scheduled travel route and the map information 300*c*. Then, the control unit 200 multiplies the time required between the scheduled points by the remaining distance/(the distance between the scheduled points), and thereby obtains scheduled time required.

When the estimated time required and the scheduled time required are obtained, the control unit 200 compares the estimated time required with the scheduled time required, and when the estimated time required exceeds the scheduled time required, the control unit 200 obtains a cause of the delay being a road situation. Note that, in the present embodiment, estimated time required is obtained based on a congestion level for each road section, and stay time at a point other than a road (e.g., break time at a break point) is not considered. Namely, time during which the delivery vehicle travels on a road is considered as time required, and a determination as to whether the delay is caused by a road situation is made based on the time required on the road. Note that when the delivery vehicle has not departed from a scheduled point, a determination for a cause of delay made based on the time required on the road may be omitted.

In addition, when the delivery vehicle has stayed at a scheduled point longer than scheduled, it is highly likely that a cause of the delay is departure delay at the scheduled point. Hence, by the function of the cause-of-delay obtaining part 210c, the control unit 200 refers to travel track record information 300b, and when the delivery vehicle is present on a road or at a break point, the control unit 200 identifies the last scheduled point from which the delivery vehicle has departed. In addition, by the function of the cause-of-delay obtaining part 210c, the control unit 200 refers to travel plan information 300a, and when the delivery vehicle is present at a scheduled point (the same point as the scheduled point or a point within a predefined distance from the scheduled point), the control unit 200 identifies the scheduled point. Furthermore, the control unit 200 obtains a scheduled time associated with the identified scheduled point.

Furthermore, the control unit 200 determines, based on travel track records, whether a departure time from the scheduled point is later than the scheduled time. Namely, when the delivery vehicle is present on a road or at a break point, the control unit 200 obtains, as a departure time, a travel time associated with a travel point present immediately after departing from the last scheduled point from which the delivery vehicle has departed (a travel point within a predefined distance from the scheduled point), and determines whether the departure time is later than the scheduled time. On the other hand, when the delivery vehicle is present at the scheduled point, the control unit 200 determines that the departure matter is later than the scheduled time, when the latest travel time is later than the scheduled time. When it is determined that the departure time is later than the scheduled time, the control unit 200 obtains a cause of the delay being departure delay.

Furthermore, when the delivery vehicle has stayed at a break point longer than scheduled, it is highly likely that a cause of the delay is excessive break time. Hence, by the function of the cause-of-delay obtaining part 210c, the control unit 200 determines whether the delivery vehicle has taken a break at a break point after the last scheduled point, by referring to travel track record information 300b. Namely, the control unit 200 refers to the map information 300c, and when a travel point of the delivery vehicle does not move with the travel point matching a point other than a road (in the present embodiment, a break point such as a rest area or a parking lot) (including a case in which the travel point is present within a predefined distance from the break point), the control unit 200 considers that the driver of the delivery vehicle has taken a break.

Furthermore, the control unit 200 obtains stay time at the break point, based on the travel track record information 300b. Namely, when a current point of the delivery vehicle is not a break point, the control unit 200 identifies, based on travel times, a period from when the travel point of the delivery vehicle has matched the break point until the travel point no longer matches the break point, and considers the period as stay time. When the current point of the delivery vehicle is a break point, the control unit 200 identifies, based on travel times, a period from when the travel point of the delivery vehicle has matched the break point until the current time, and considers the period as stay time. Then, the control unit 200 determines whether the stay period of the delivery vehicle at a point other than a road is longer than a reference period. If the stay period is longer than the reference period, the control unit 200 obtains a cause of the delay being excessive break time. Note that the reference period is determined in advance by a travel plan, etc.

A determination as to whether there is a delay and obtaining of a cause of the delay such as those described above are performed for each delivery vehicle. As a result, the control unit 200 identifies, for each delivery vehicle, whether there is a delay in a travel plan, and if there is a delay, the control unit 200 identifies a cause of the delay.

The cause-of-delay output part 210d is a program module that allows the control unit 200 to perform a function of outputting a cause of delay. In the present embodiment, a cause of delay is outputted to the operation manager who uses the operation manager's terminal 50. Namely, the operation manager can provide an instruction to output a desired delivery vehicle by operating the operation manager's terminal 50. When the instruction is provided, identification information of the delivery vehicle is transmitted.

Hence, the control unit 200 obtains the identification information of the delivery vehicle through the communication unit 400, and extracts a cause of delay for the delivery vehicle specified by the identification information from among causes of delay obtained by the function of the cause-of-delay obtaining part 210c. Then, the control unit 200 transmits the cause of delay through the communication unit 400. As a result, the cause of delay is displayed on the operation manager's terminal 50.

According to the above configuration, the operation management system 100 can automatically collect travel track records of a delivery vehicle and obtain a cause of delay based on the travel track records and a travel plan. Hence, a system can be provided that obtains and outputs a cause of delay without based on, for example, input by a human such as a vehicle driver. Therefore, when a delay has occurred, the operation manager can securely understand a cause of the delay. Hence, by the operation manager taking measures to solve the cause of the delay, the possibility of preventing the recurrence of delays can be increased. As a result, the possibility of being able to perform management such that a vehicle is operated as scheduled can be increased.

(1-3) Configuration of the Operation Manager's Terminal

The operation manager's terminal 50 is a terminal for the operation manager to check whether there is a delay, a cause of the delay, etc., for each delivery vehicle. The operation manager's terminal 50 includes a control unit 52 including a CPU, a RAM, a ROM, etc., a recording medium which is not shown, a user I/F unit 54, and a communication unit 55. The control unit 52 can execute a program (not shown) which is stored in the recording medium (not shown) or the ROM. Note that the recording medium which is not shown records the same information as the travel plan information 300a and the map information 300c.

The user I/F unit 54 includes an input unit that accepts input from the operation manager; and an output unit that displays information, and can display arbitrary information on the output unit. Needless to say, the output mode of the output unit is not limited to display and may be audio output, etc. The communication unit 55 includes a circuit that performs communication with other apparatuses. The control unit 52 can perform communication with the operation management system 100 through the communication unit 55.

By a function of the program which is not shown, the control unit 52 can display whether there is a delay, a cause of the delay, etc., for each delivery vehicle, on the output unit of the user I/F unit 54. Namely, the control unit 52 controls the user I/F unit 54 to display an interface screen allowing to input information (identification information, etc.) that specifies a delivery vehicle. When the operation manager specifies identification information by operating the input unit of the user I/F unit 54, the control unit 52 transmits the identification information to the operation management system 100 through the communication unit 55.

When the operation management system 100 obtains the identification information, the operation management system 100 sends, as a response, information indicating whether there is a delay and a cause of the delay of a delivery vehicle indicated by the identification information. The control unit 52 receives the information through the communication unit 55, and allows the output unit of the user I/F unit 347 to display whether there is a delay and a cause of the delay. Various display modes of a cause of the delay can be adopted. In the present embodiment, the control unit 52 can display a scheduled travel route on a map by referring to the map information 300c, and display information indicating a cause of the delay on the map.

(2) Process of Determining Whether there is a Delay

Figure 2:
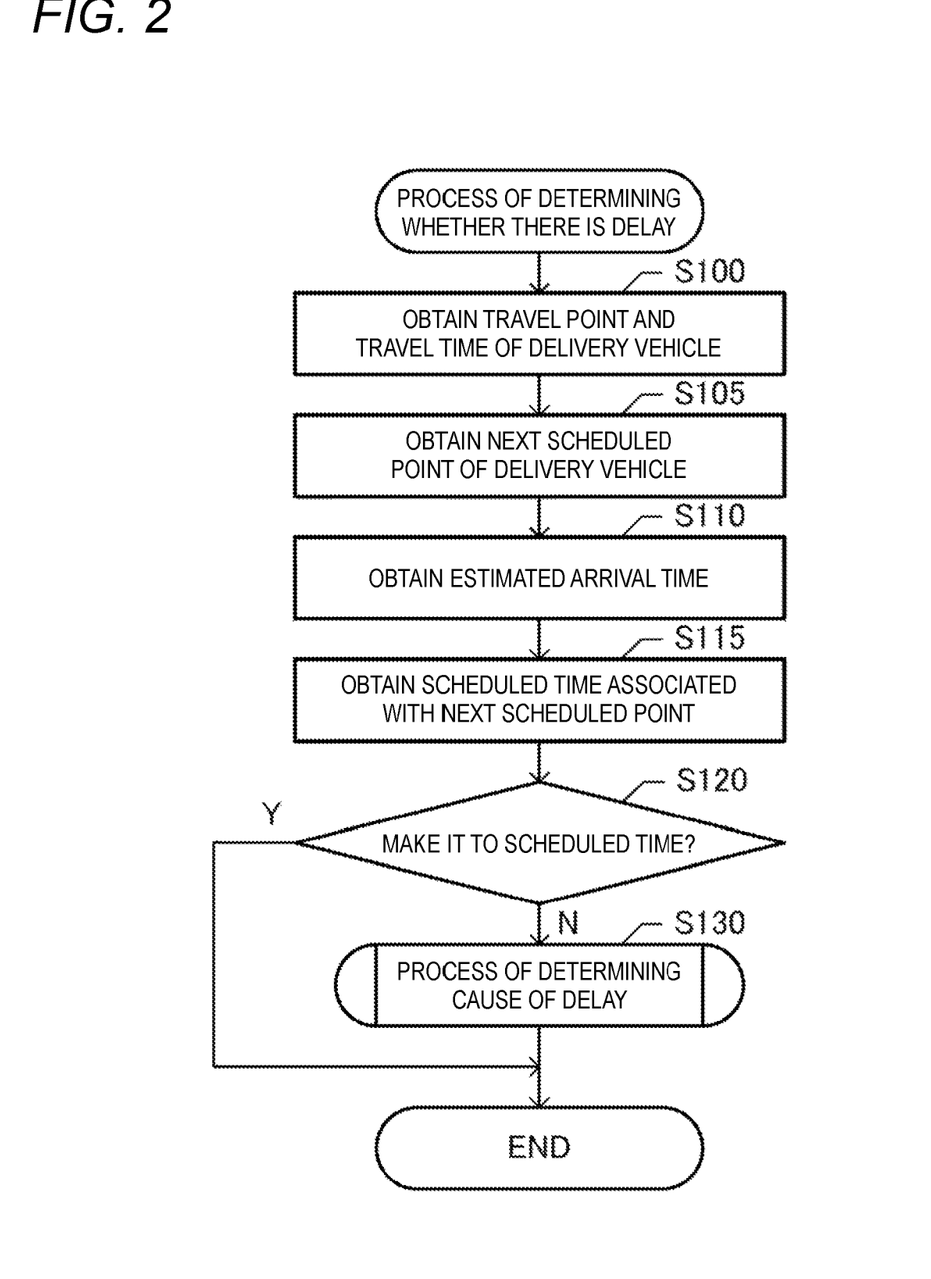
FIG. 2 is a flowchart showing a process of determining whether there is a delay.

Next, a process of determining whether there is a delay which is performed by the control unit 200 using the function of the cause-of-delay obtaining part 210c will be described. In the operation management system 100, travel plan information 300a is recorded in advance in the recording medium 300. In addition, the control unit 200 monitors the communication unit 400, and when travel track record information 300b is transmitted from the navigation system 10, the control unit 200 records the travel track record information 300b in the recording medium 300.

In a state in which the operation management system 100 is thus in operation, the control unit 200 performs a process of determining whether there is a delay which is shown in FIG. 2, on each delivery vehicle which is a processing target, every certain period (e.g., 100 ms). When the process of determining whether there is a delay starts, the control unit 200 obtains a travel point and a travel time of a delivery vehicle (step S100). Namely, the control unit 200 obtains the latest travel point and travel time of a processing-target delivery vehicle by referring to travel track record information 300b with which identification information of the processing-target delivery vehicle is associated.

Then, the control unit 200 obtains a next scheduled point of the delivery vehicle (step S105). Namely, the control unit 200 obtains, as a next scheduled point, a scheduled point at which the delivery vehicle is scheduled to arrive after the latest travel point, by referring to travel plan information 300a with which the identification information of the processing-target delivery vehicle is associated. Specifically, the control unit 200 obtains, as a next scheduled point, the closest scheduled point to the latest travel point for when the delivery vehicle travels along a scheduled travel route. Note that when the travel point of the delivery vehicle matches a scheduled point, the first scheduled point at which the delivery vehicle is supposed to arrive after the scheduled point serves as a next scheduled point.

Then, the control unit 200 obtains an estimated arrival time (step S110). Namely, the control unit 200 obtains a congestion level of each road section included in the scheduled travel route through the communication unit 400, and obtains estimated time required to reach the next scheduled point from a current location, based on the congestion level. Then, the control unit 200 obtains a scheduled time associated with the next scheduled point (step S115). Namely, the control unit 200 obtains a scheduled time associated with the next scheduled point, by referring to the travel plan information 300a with which the identification information of the processing-target delivery vehicle is associated.

Then, the control unit 200 determines whether the delivery vehicle can make it to the scheduled time (step S120). Namely, when the scheduled time obtained at step S115 is later than the estimated arrival time obtained at step S110, the control unit 200 determines that the delivery vehicle can make it to the scheduled time. If it is not determined at step S120 that the delivery vehicle can make it to the scheduled time, it is considered that a delay has occurred, and thus, the control unit 200 performs a process of determining a cause of delay (step S130). On the other hand, if it is determined at step S120 that the delivery vehicle can make it to the scheduled time, the control unit 200 skips step S130 and ends the process of determining whether there is a delay. In this case, after a certain period, a process of determining whether there is a delay is performed again.

As described above, in the present embodiment, the control unit 200 is configured to determine whether a delivery vehicle can make it to a next scheduled point. Therefore, when travel plan information 300a of a given delivery vehicle includes three or more scheduled points, there are a plurality of sections from each scheduled point to a next scheduled point, and a determination as to whether a delay has occurred is made for each section.

(3) Process of Determining a Cause of Delay

Figure 3:
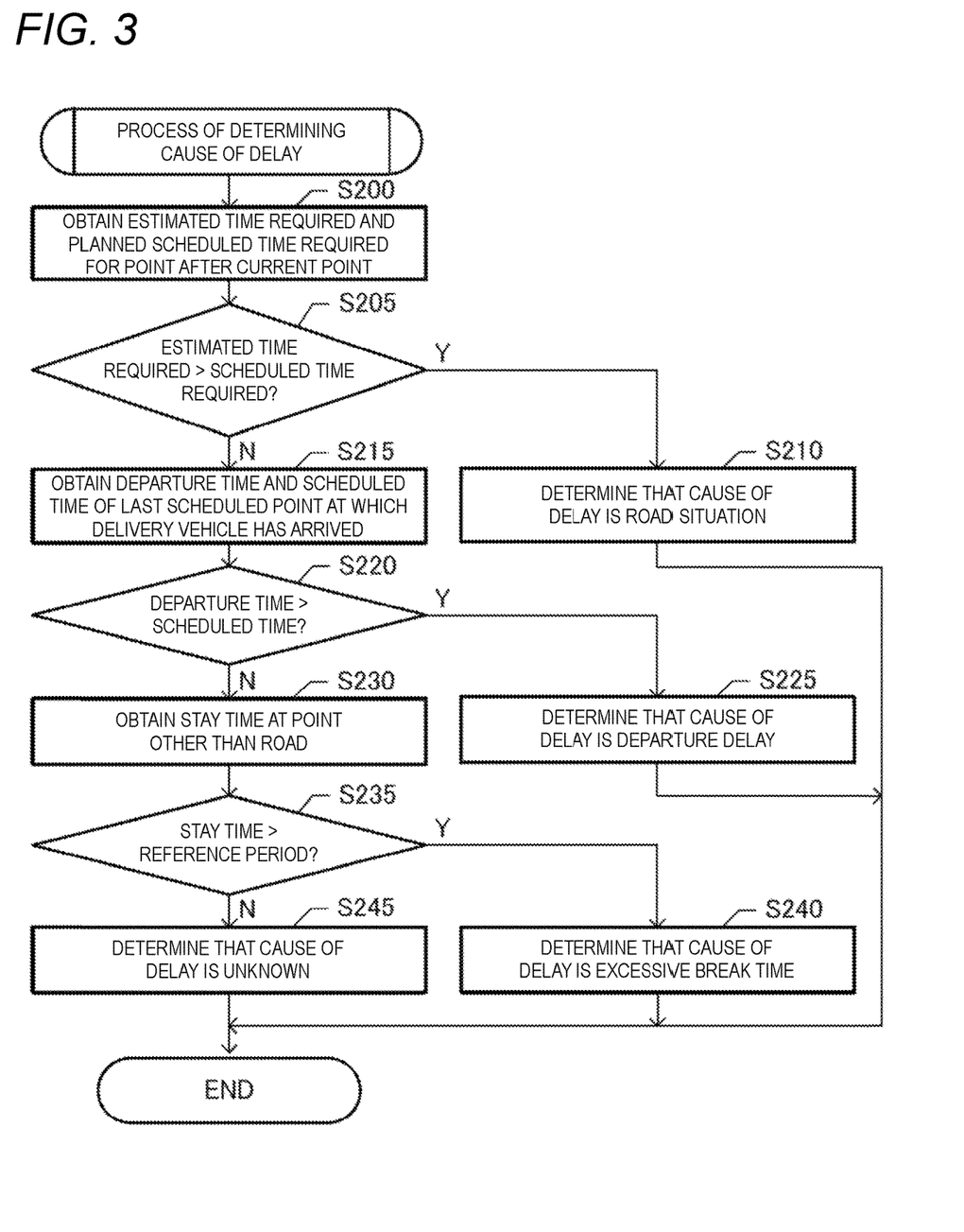
FIG. 3 is a flowchart showing a process of determining a cause of delay.

Next, a process of determining a cause of delay which is performed by the control unit 200 using the function of the cause-of-delay obtaining part 210c will be described. In the process of determining a cause of delay, the control unit 200 obtains estimated time required and planned scheduled time required for a point after a current point (step S200). Namely, the control unit 200 obtains a congestion level of each road section included in a scheduled travel route through the communication unit 400, and obtains estimated time required to reach a next scheduled point from a current location, based on the congestion level. Furthermore, the control unit 200 obtains scheduled time required by, for example, multiplying time required between scheduled points which is a difference between scheduled times associated with the last scheduled point from which the delivery vehicle has departed and a next scheduled point to which the delivery vehicle is currently heading, by a ratio between the remaining distance from the current point to the next scheduled point and the distance between the scheduled points.

Then, the control unit 200 determines whether the estimated time required is longer than the scheduled time required (step S205). If it is determined at step S205 that the estimated time required is longer than the scheduled time required, the control unit 200 determines that a cause of delay is a road situation (step S210).

On the other hand, if it is not determined at step S205 that the estimated time required is longer than the scheduled time required, the control unit 200 obtains the departure time and scheduled time of the last scheduled point at which the delivery vehicle has arrived (step S215). Namely, the control unit 200 refers to travel track record information 300b, and when the delivery vehicle is present on a road or at a break point, the control unit 200 identifies the last scheduled point from which the delivery vehicle has departed. When the delivery vehicle is present at a scheduled point, the scheduled point is the last scheduled point from which the delivery vehicle has departed.

Furthermore, the control unit 200 obtains a departure time from the scheduled point, based on travel track records. Namely, the control unit 200 obtains, as a departure time, a travel time associated with a travel point present immediately after departing from the last scheduled point from which the delivery vehicle has departed. When the delivery vehicle is present at a scheduled point, a determination can be made by, for example, considering a travel time included in the last travel track record information 300*b* obtained, as a departure time. Furthermore, the control unit 20 obtains a scheduled time associated with the last scheduled point at which the delivery vehicle has arrived or with the scheduled point at which the delivery vehicle is present.

Then, the control unit 200 determines whether the departure time obtained at step S215 is later than the scheduled time (step S220). If it is determined at step S220 that the departure time is later than the scheduled time, the control unit 200 determines that a cause of delay is departure delay (step S225).

On the other hand, if it is not determined at step S220 that the departure time is later than the scheduled time, the control unit 200, the control unit 20, obtains stay time of the delivery vehicle at a point other than a road (step S230). Namely, the control unit 200 refers to the map information 300*c* and when, after departing a scheduled point, a travel point of the delivery vehicle does not move with the travel point matching a point other than a road, the control unit 200 considers that the driver of the delivery vehicle has taken a break. Furthermore, the control unit 200 identifies, based on the travel track record information 300*b*, based on travel times, a period from when the travel point of the delivery vehicle has matched a break point until the travel point no longer matches the break point, and considers the period as stay time. When the current point of the delivery vehicle is a break point, the control unit 200 identifies, based on travel times, a period from when the travel point of the delivery vehicle has matched the break point until the current time, and considers the period as stay time.

Then, the control unit 200 determines whether the stay time is longer than reference time (step S235). If it is determined at step S235 that the stay time is longer than reference time, the control unit 200 determines that a cause of delay is excessive break time (step S240). On the other hand, if it is not determined at step S235 that the stay time is longer than reference time, the control unit 200 determines that a cause of delay is unknown (step S245).

In a case in which a delay has occurred in a processing-target delivery vehicle, when a cause of the delay is identified in the above-described manner, the control unit 200 records, for a section where the processing-target delivery vehicle is present, information indicating that the occurrence of a delay has occurred and information indicating a cause of the delay, in a memory such as the RAM such that those pieces of information are associated with each other.

In the above configuration, the control unit 200 is configured to determine, when a delivery vehicle cannot make it to a next scheduled point, a cause of delay for a section before the next scheduled point. Therefore, when travel plan information 300*a* of a given delivery vehicle includes three or more scheduled points, there are a plurality of sections from each scheduled point to a next scheduled point, and a cause of delay is identified for a section where the delivery vehicle is currently present. Hence, even when a cause of delay is unknown for a section where the delivery vehicle is currently present, a road situation or departure delay may be identified as a cause of delay for a section before the section where the delivery vehicle is currently present.

(4) Examples of Output

In a state in which whether there is a delay and a cause of the delay are identified for each delivery vehicle by the above processes, when the operation manager's terminal 50 specifies identification information of a delivery vehicle, the control unit 200 outputs a cause of the delay by the function of the cause-of-delay output part 210*d*. The operation manager's terminal 50 can output the cause of the delay in various modes.

Figure 4A:
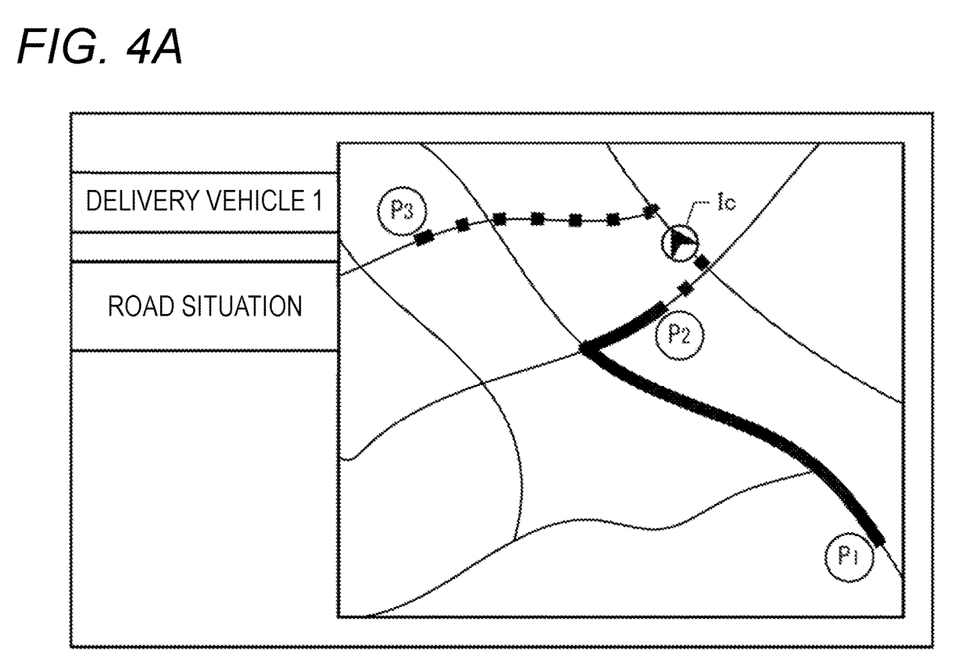
FIGS. 4A and 4B are diagrams showing examples of output of a cause of delay.
Figure 4B:
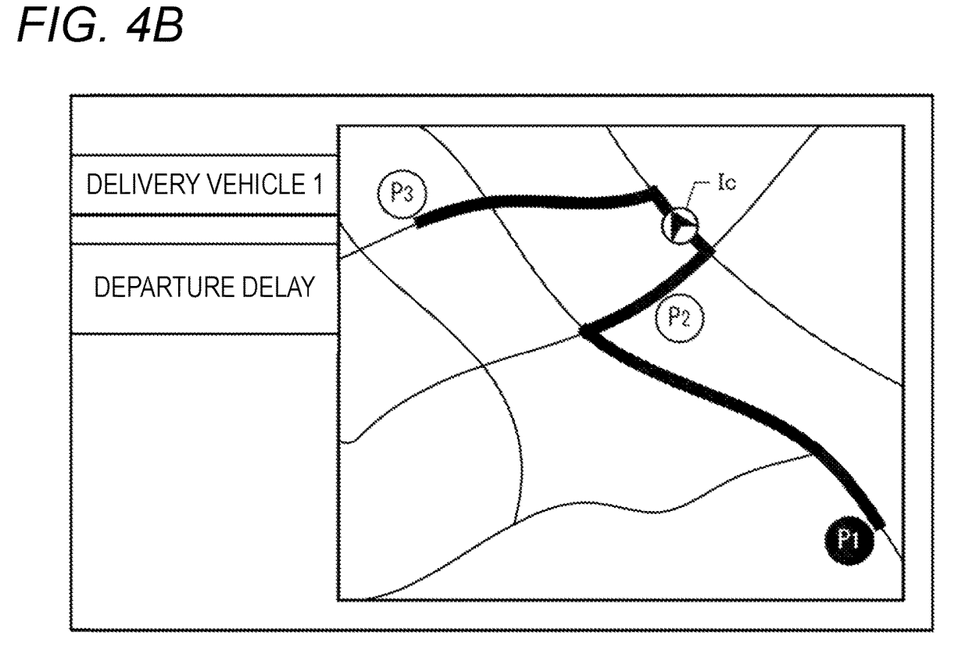

FIGS. 4A and 4B are diagrams showing examples of output of a cause of delay. In the examples, it is assumed that a vehicle whose cause of delay is outputted is a delivery vehicle 1. In addition, in the examples, a scheduled travel route and scheduled points which are included in a travel plan of the delivery vehicle are displayed on a map. Namely, in FIGS. 4A and 4B, the delivery vehicle 1 is planned to perform delivery in the order of scheduled points $P_1$, $P_2$, and $P_3$, and a scheduled travel route for the scheduled points $P_1$ to $P_3$ is indicated by a thick line, and a current point (the latest travel point) of the delivery vehicle is indicated by an icon Ic. Therefore, in both of FIGS. 4A and 4B, a state in which the delivery vehicle is present in a section between the scheduled points $P_2$ and $P_3$ is assumed.

In addition, in both of FIGS. 4A and 4B, it is assumed that at a location indicated by the icon Ic the delivery vehicle cannot make it to a scheduled time associated with the next scheduled point $P_3$, and a delay has occurred. Note, however, that a cause of the delay assumed in FIG. 4A differs from that assumed in FIG. 4B, and the cause of the delay of the delivery vehicle 1 in FIG. 4A is a road situation in a section between the scheduled points $P_2$ and $P_3$, and the cause of the delay of the delivery vehicle 1 in FIG. 4B is departure delay at the scheduled point $P_1$. These causes of the delay are represented by characters and are also represented on the map.

In FIG. 4A, a road in a section between the scheduled points $P_2$ and $P_3$ is indicated by a broken line, indicating that the road situation of the section is poorer than normal (e.g., an accident or congestion), by which the operation manager can understand that a delay in arrival at the scheduled point $P_3$ occurs due to the road situation. When the cause of the delay is thus shown, by analyzing whether a delay frequently occurs in the same section for the same cause, etc., it is possible to take measures, e.g., changing a delivery route. As a result, operation management can be performed to perform more efficient operation.

On the other hand, in FIG. 4B, the icon indicating the scheduled point $P_1$ is highlighted over other scheduled points, indicating that departure from the scheduled point is later than scheduled, by which the operation manager can understand that a delay in arrival at the scheduled point $P_3$ occurs due to the departure delay. When the cause of the delay is thus shown, by analyzing whether a delay frequently occurs at the same scheduled point for the same cause, etc., it is possible to take measures, e.g., changing a task at the scheduled point. As a result, operation management can be performed to perform more efficient operation.

(5) Other Embodiments

As long as a cause of delay is obtained based on travel track records, various other embodiments can also be adopted. For example, a configuration may be adopted in which travel plan information 300*a* does not include a scheduled travel route. In this case, for example, a configuration can be adopted in which a scheduled travel route is left to the discretion of a driver of a delivery vehicle, and scheduled points and scheduled times are agreed by the operation manager and shippers.

The systems forming the above-described embodiment may be composed of a smaller number of apparatuses whose functions are shared therebetween. Such an example includes one in which at least one system shown in FIG. 1 is composed of the same apparatus as other one or more systems. For example, the navigation system 10 and the operation manager's terminal 50 may be composed of an integrated apparatus, or the operation management system 100 and the operation manager's terminal 50 may be composed of an integrated apparatus, or the operation management system 100 and the navigation system 10 may be composed of an integrated apparatus.

Needless to say, the navigation system 10 may be included in a vehicle or may be a portal terminal, etc. Furthermore, the systems shown in FIG. 1 may be composed of a larger number of systems. For example, the operation management system 100 may be composed of cloud servers.

In addition, at least one of the parts (the travel plan obtaining part 210a, the travel track record obtaining part 210b, the cause-of-delay obtaining part 210c, and the cause-of-delay output part 210d) included in the operation management system 100 may be present separated into a plurality of apparatuses. For example, the travel plan obtaining part 210a, the travel track record obtaining part 210b, the cause-of-delay obtaining part 210c, etc., may be configured to be executed by the navigation system 10 or the operation manager's terminal 50. In addition, a configuration in which a part of the configuration of the above-described embodiment is omitted or a configuration in which a process is changed or omitted can also be assumed.

The travel plan obtaining part may be configured in any manner as long as the travel plan obtaining part can obtain a travel plan including scheduled points and scheduled times associated with the scheduled points. Namely, the travel plan obtaining part may be configured in any manner as long as points at which a vehicle is supposed to arrive and times associated with the points are defined in advance as a travel plan and the travel plan obtaining part can obtain the travel plan. The scheduled points include a vehicle's travel start point, i.e., a departure point, and when there is one point at which the vehicle is supposed to arrive after departure, two points in total serve as scheduled points. When there are N points at which the vehicle is supposed to arrive after departure (N is an integer greater than or equal to 2), (N+1) points in total serve as scheduled points.

The scheduled points including the departure point may be points at which loading and unloading are performed as in the above-described embodiment, or may be points for other purposes. For example, in a case of human transport, etc., points at which humans get on and off can serve as scheduled points, and in a case of a visit to a destination, the destination can serve as a scheduled point. In addition, a range in which scheduled points are considered to be the same may be set according to the mode of a plan. For example, when loading and unloading are performed at a plurality of points in a wide location, each of the plurality of points may serve as a scheduled point, or a representative point indicating the location may serve as a scheduled point, and various configurations can be adopted.

The scheduled times may be configured in any manner as long as the scheduled times are associated with the scheduled points and as long as whether there is a delay and a cause of the delay in a travel plan can be evaluated based on the scheduled times. At least one scheduled time needs to be set for the same point, and two or more scheduled times may be set. For example, a scheduled time may be defined so as to be associated with an object to be attained by a vehicle before the scheduled time, and a scheduled arrival time at a scheduled point, a scheduled departure time from the scheduled point, etc., may serve as scheduled times. When two or more scheduled times are set, a time used for a determination as to whether there is a delay in a travel plan is determined in advance. For example, when a scheduled arrival time and a scheduled departure time are associated with a single scheduled point, it is determined in advance whether a determination as to whether there is a delay is made based on either one of the times or based on both times.

The travel track record obtaining part may be configured in any manner as long as the travel track record obtaining part can obtain a travel track record including a travel point of a vehicle and a travel time associated with the travel point. Namely, the travel track record obtaining part may be configured in any manner as long as the travel track record obtaining part can obtain a travel history including at least a travel point at which the vehicle has traveled and a travel time at which the vehicle has traveled at the travel point.

The travel point may be configured in any manner as long as the travel point is a point at which the vehicle has actually traveled. For example, the configuration may be such that a current vehicle location is obtained at predetermined timing, and the obtained location is considered as a travel point. Note that, for the predetermined timing, various timing can be assumed and include, for example, timing for every certain period, timing at which the vehicle has decelerated, timing at which the vehicle has stopped, and timing at which a predefined operation is performed on the vehicle.

The cause-of-delay obtaining part may be configured in any manner as long as the cause-of-delay obtaining part can obtain, when a delay has occurred in a travel plan, a cause of the delay based on travel track records and the travel plan. Namely, the travel track record is information in which a travel time is associated with a travel point at which the vehicle has traveled, and the travel plan is information in which scheduled times are associated with scheduled points. Therefore, by comparing those two pieces of information, at which stage of the travel plan a delay has occurred or at which stage a delay is estimated to occur can be identified. Hence, a cause of the delay can be obtained.

For the cause of delay, various causes can be assumed. For example, a configuration can be adopted in which a cause of delay is obtained based on the behavior, presence point, etc., of a vehicle. An example of such a configuration includes one in which it is identified, based on travel track records, whether the presence point of the vehicle is a scheduled point, on a road, or a point other than a road which is not a scheduled point (a break point, etc.). More specifically, an example of the configuration includes one in which when a delay has occurred with the vehicle being present at a scheduled point, a cause of the delay is determined to be departure delay, when a delay has occurred with the vehicle being present on a road, a cause of the delay is determined to be a road situation, and when a delay has occurred with the vehicle being present at a point other than a road which is not a scheduled point, a cause of the delay is determined to be excessive break time.

Note that upon determining whether a delay has occurred due to a presence point, for example, the configuration may be such that when a delay is confirmed or a delay is estimated to occur with the vehicle being present at each point, it is determined that a delay has occurred, or the configuration may be such that a stay period at each point is identified based on travel track records and when the stay period is longer than or equal to a predefined period, it is determined that a delay has occurred.

A cause occurring at a scheduled point and a cause occurring between scheduled points may be determined in more detail. For example, when it has been found, based on travel track records, that despite the fact that the vehicle has arrived at a scheduled point before a scheduled time (in a case of a departure point, the vehicle is present at the departure point from the start), the vehicle stays at the scheduled point even after the scheduled time has passed, a cause occurring at the scheduled point, e.g., departure delay, being a cause of the delay may be obtained.

In addition, when it is estimated or confirmed based on travel track records that the vehicle has departed from a given scheduled point without delay but has not arrived at a next scheduled point at a scheduled time, a cause occurring between the given scheduled point and the next scheduled point (e.g., a road situation) being a cause of the delay may be obtained.

Note that a determination as to whether a delay has occurred may be made by the cause-of-delay obtaining part or may be made by a determining unit (e.g., the navigation system) different from the cause-of-delay obtaining part. In addition, for a technique for determining whether a delay has occurred, various other techniques than a technique in which an estimated arrival time is calculated as described above may be adopted. For example, the configuration may be such that when, for example, a travel time for a scheduled point has passed a scheduled time, it is determined that a delay has occurred. In this case, the scheduled point is not limited to a loading and unloading point and may be, for example, any point set on a road.

The cause-of-delay output part may be configured in any manner as long as the cause-of-delay output part can output a cause of delay. An output destination is not limited to an external apparatus (the operation manager who operates the apparatus) like the above-described embodiment, and may be an output unit (a display, a speaker, etc.) included in the operation management system.

Furthermore, a technique for obtaining a cause of delay is not limited to the above-described technique. For example, a configuration can be adopted in which when an estimated arrival time for a scheduled point is later than a scheduled time for the scheduled point, a cause of delay being a road situation is obtained. Furthermore, to determine whether a cause of delay is a road situation, traffic information on a road may be analyzed. Such a configuration can be implemented by, for example, a configuration in which in the above-described operation management system 100 shown in FIG. 1, the cause-of-delay obtaining part 210c analyzes traffic information.

Namely, for example, a configuration can be adopted in which when it is determined that a delay has occurred in a delivery vehicle, by the function of the cause-of-delay obtaining part 210c, the control unit 200 refers to travel track record information 300b, and when it is identified, based on changes in time at travel points, that the delivery vehicle travels on a road and the vehicle speed is lower than a reference vehicle speed, a cause of the delay being a road situation is obtained. More specifically, for example, a configuration can be adopted in which the flowchart shown in FIG. 3 is replaced by flowcharts shown in FIGS. 5 and 6. Namely, if it is determined at the above-described step S205 of FIG. 3 that the estimated time required is longer than the scheduled time required, the control unit 200 obtains a vehicle speed based on travel track record information 300b (step S206). The vehicle speed can be achieved by, for example, a process of identifying a travel distance based on a plurality of travel points including the latest travel track record, identifying time required based on a plurality of corresponding travel times, and dividing the travel distance by the time required.

Figure 5:
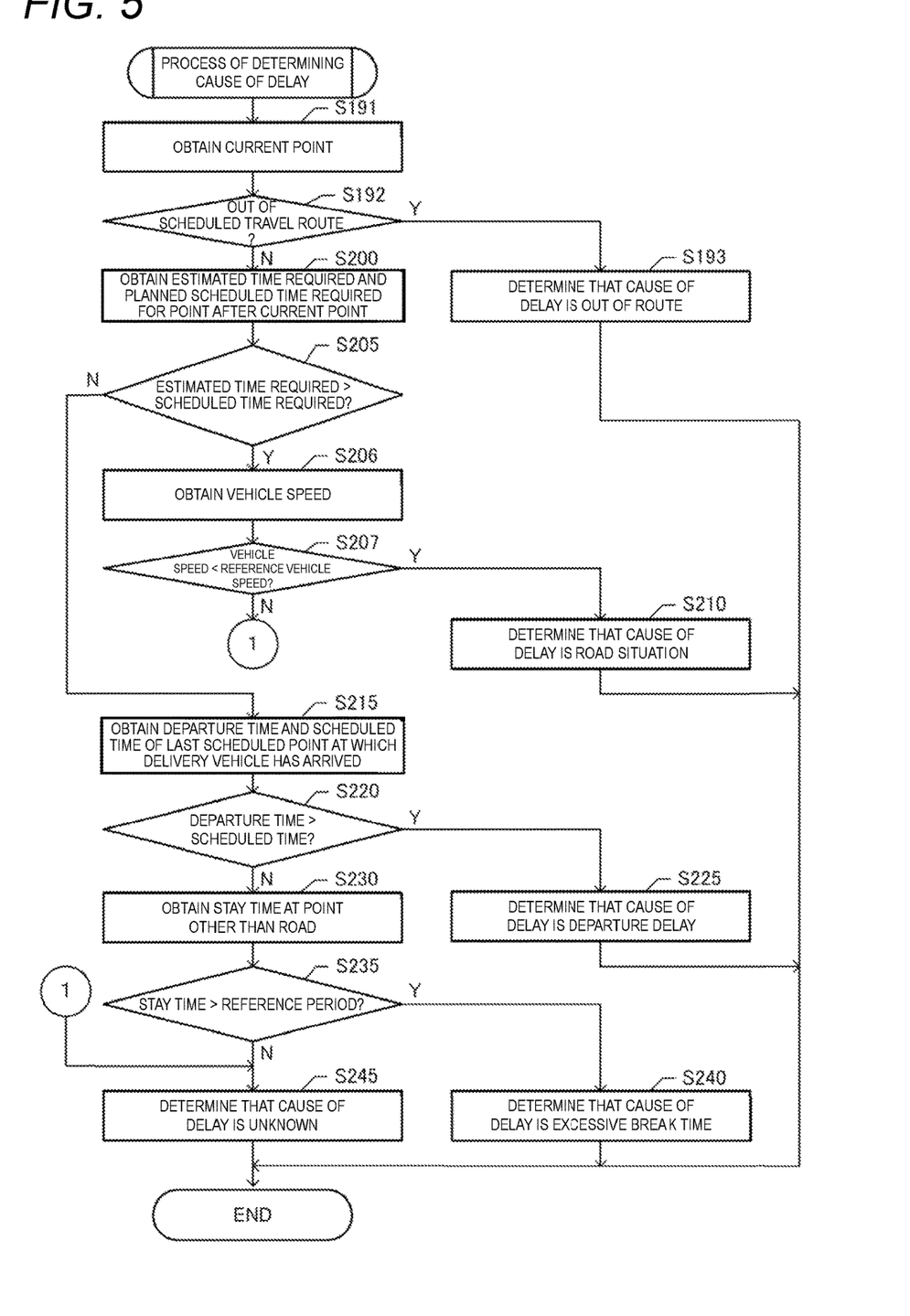
FIG. 5 is a flowchart showing a process of determining a cause of delay according to another embodiment.
Figure 6:
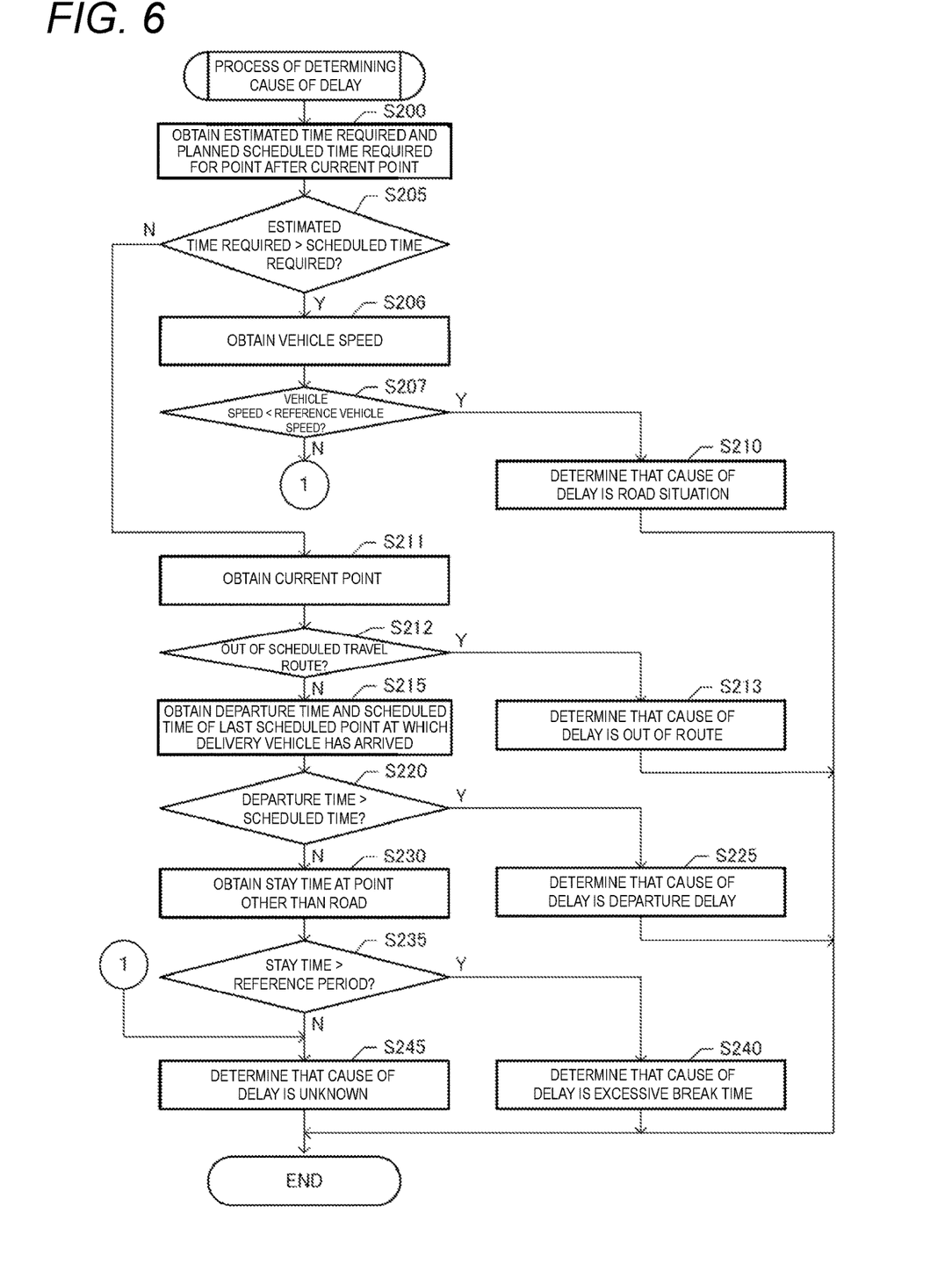
FIG. 6 is a flowchart showing a process of determining a cause of delay according to still another embodiment.

Then, the control unit 200 determines whether the vehicle speed is lower than a reference vehicle speed (step S207). If it is determined that the vehicle speed is lower than a reference vehicle speed, the control unit 200 performs step S210. If it is not determined that the vehicle speed is lower than a reference, the control unit 200 performs step S245. According to this configuration, with the fact that the vehicle speed of the delivery vehicle is lower than the reference vehicle speed being verified, a cause of delay being a road situation can be obtained. Therefore, the possibility of being able to accurately identify a cause of delay being a road situation can be increased.

Furthermore, the configuration may be such that when the vehicle goes out of a scheduled travel route, it is determined that out of the route is a cause of delay. This configuration can be implemented by, for example, adding the following configuration to the above-described configuration shown in FIG. 1. Namely, for example, the following configuration can be adopted. Specifically, when it is determined that a delay has occurred in the delivery vehicle, by the function of the cause-of-delay obtaining part 210c, the control unit 200 obtains a scheduled travel route based on travel plan information 300a, and obtains a travel point by referring to travel track record information 300b. Then, the control unit 200 determines whether the travel point is along the scheduled travel route. If the travel point is not along the scheduled travel route and is out of the scheduled travel route, a cause of the delay being out of the route is obtained.

More specifically, for example, a configuration can be adopted in which the flowchart shown in FIG. 3 is replaced by the flowcharts shown in FIGS. 5 and 6. In the flowchart shown in FIG. 5, before determining whether a cause of the delay is a road situation, it is determined whether the cause of the delay is out of a route. Namely, when a process of determining a cause of delay starts, the control unit 200 obtains a current point of the delivery vehicle based on travel track record information 300b (step S191). The current point of the delivery vehicle can be achieved by, for example, a process of considering the latest travel point as the current point.

Then, the control unit 200 determines whether the current point is out of a scheduled travel route (step S192). If it is determined that the current point is out of a scheduled travel route, the control unit 200 determines that a cause of the delay is out of the route (step S193). If it is not determined at step S192 that the current point is out of a scheduled travel route, the control unit 200 performs processes at and after step S200.

On the other hand, in the flowchart shown in FIG. 6, after determining whether a cause of the delay is a road situation, it is determined whether the cause of the delay is out of a route. Namely, when it is not determined at step S205 that the estimated time required is longer than the scheduled time required, the control unit 200 performs step S211 and step S212. Step S211 and step S212 are the same processes as step S191 and step S192 shown in FIG. 5. Then, if it is determined at step S212 that the current point is out of a scheduled travel route, the control unit 200 determines that a cause of the delay is out of the route (step SS213).

If it is not determined at step S212 that the current point is out of a scheduled travel route, the control unit 200 performs processes at and after step S215. Needless to say, a determination as to whether a cause of the delay is out of the route may be made after determining whether the cause of the delay is departure delay or determining whether the cause of the delay is excessive break time. In addition, a determination as to whether a cause of the delay is out of the route may be made when it is not determined at step S207 that the vehicle speed is lower than a reference vehicle speed. According to the above configuration, a case in which the driver has taken a wrong scheduled travel route or the occurrence of a delay due to the driver getting lost can be identified.

Furthermore, in a configuration in which scheduled times indicated by travel plan information include a scheduled arrival time at a scheduled point and a scheduled departure time from the scheduled point, a detailed cause of delay may be obtained based on a difference between the definitions of the times. For example, a configuration is assumed in which, in the above-described configuration shown in FIG. 1, scheduled times indicated by travel plan information 300a include a scheduled arrival time and a scheduled departure time. In this configuration, by the function of the cause-of-delay obtaining part 210c, the control unit 200 compares an arrival time at a scheduled point with a scheduled arrival time at the scheduled point, based on travel track record information 300b. When the arrival time is before the scheduled arrival time, the control unit 200 determines that the delivery vehicle has arrived at the scheduled point in time. In this case, it is estimated that the delivery vehicle is operating as planned.

Furthermore, the control unit 200 obtains a departure time from the scheduled point based on the travel track record information 300b, to determine whether the departure time is later than a scheduled departure time. Then, when the departure time is later than the scheduled departure time despite the fact that the delivery vehicle has arrived at the scheduled point in time, it is estimated that there is a problem on a scheduled point side rather than the delivery vehicle. Hence, the control unit 200 obtains a cause of the delay being a delay at the scheduled point. Note that the delay at the scheduled point is, for example, caused by a facility side present at the scheduled point, and the cause thereof is one not resulting from the delivery vehicle or the driver of the delivery vehicle, e.g., goods are piled up, goods have not been arrived, or a yard for loading and unloading is crowded.

Furthermore, a technique for obtaining a cause of delay based on travel track records can also be applied as a program or a method. In addition, a system, a program, and a method such as those described above may be implemented as a single apparatus or may be implemented by using parts shared with parts included in a vehicle, and thus include various modes. For example, it is possible to provide a method and a program that are implemented by a system such as that described above. In addition, changes can be made as appropriate, e.g., a part is software and a part is hardware. Furthermore, exemplary embodiments can also serve as a recording medium for a program that controls an apparatus. Needless to say, the recording medium for software may be a magnetic recording medium or a magneto-optical recording medium.

What is claimed is:

1. An operation management system for managing a delivery vehicle that makes a plurality of delivery stops along a delivery route, the system comprising:
a processor programmed to:
obtain a travel plan for the delivery vehicle, the travel plan including a plurality of planned delivery stops and a scheduled time associated with each of the planned delivery stops;
obtain a travel track record for the delivery vehicle showing travel progress of the delivery vehicle along the travel plan, the travel track record including the delivery stops and a travel time associated with each of the delivery stops, the delivery stops being the planned delivery stops for which the delivery vehicle has already stopped along the travel plan;
for each of the delivery stops:
determine whether a delay has occurred by referring to the scheduled time for the delivery stop and the travel time associated with the delivery stop;
upon a determination that a delay has occurred for the delivery stop, determine a cause of the delay by referring to the scheduled time for the delivery stop with the travel time associated with the delivery stop so that the determination of the cause of the delay is made without reference to input from a driver of the delivery vehicle or a driver of another vehicle; and
output the determined cause of the delay for the delivery stop.

2. The operation management system according to claim 1, wherein
the travel plan includes a scheduled travel route of the vehicle; and
the processor is programmed to, for each of the delivery stops:
obtain an estimated arrival time at which the vehicle arrives at the delivery stop when the vehicle travels along the scheduled travel route of the vehicle; and
determine that the delay has occurred when the estimated arrival time is later than the scheduled time.

3. The operation management system according to claim 1, wherein
the travel plan includes a scheduled travel route of the vehicle; and
the processor is programmed to, for each of the delivery stops:
obtain based on the travel track record, an estimated time required when the vehicle travels along the scheduled travel route of the vehicle; and
determine the cause of the delay to be a road situation when the estimated time required exceeds a scheduled time required when the vehicle travels according to the travel plan.

4. The operation management system according to claim 2, wherein the processor is programmed to:
determine, based on the travel track record, whether the vehicle travels on a road and a vehicle speed is lower than a reference vehicle speed; and
when it is determined that the vehicle travels on the road and the vehicle speed is lower than the reference vehicle speed, determines the cause of the delay to be a road situation.

5. The operation management system according to claim 1, wherein the processor is programmed to, for each of the delivery stops:
determine, based on the travel track record, whether a departure time from the delivery stop is later than the scheduled time associated with the delivery stop; and when the departure time from the delivery stops is later than the scheduled time associated with the delivery stop, determine the cause of the delay to be departure delay.

6. The operation management system according to claim 1, wherein the processor is programmed to:
   determine, based on the travel track record, that a stay period of the vehicle at a point other than a road is longer than a reference period; and
   when the stay period of the vehicle at the point other than the road is longer than the reference period, determine the cause of the delay to be excessive break time.

7. The operation management system according to claim 1, wherein
   the travel plan includes a scheduled travel route of the vehicle; and
   the processor is programmed to:
      identify, based on the travel track record, whether the vehicle has traveled on a road out of the scheduled travel route of the vehicle; and
      when the vehicle has traveled on the road out of the scheduled travel route of the vehicle, determine the cause of the delay to be a state of being out of the scheduled travel route.

8. The operation management system according to claim 1, wherein
   the scheduled time includes a scheduled arrival time at the delivery stop and a scheduled departure time from the delivery stop; and
   the processor is programmed to, for each delivery stop:
      determine, based on the travel track record, that an arrival time at the delivery stop is before the scheduled arrival time and a departure time from the delivery stop is later than the scheduled departure time; and
      when the arrival time at the delivery stop is before the scheduled arrival time and the departure time from the delivery stop is later than the scheduled departure time, determine the cause of the delay to be a delay at the delivery stop.

9. The operation management system according to claim 1, wherein
   the travel plan includes three or more delivery stops; and
   the cause of the delay is obtained for each section between the delivery stops.

10. The operation management system according to claim 3, wherein
    the road situation is at least one of an accident or congestion.

11. The operation management system according to claim 4, wherein
    the road situation is at least one of an accident or congestion.

12. An operation management system for managing a vehicle that makes a plurality of stops along a route, the system comprising:
    a processor programmed to:
       obtain a travel track record including a plurality of stops of a vehicle and a travel time associated with each of the stops;
       obtain a travel track record for the vehicle showing travel progress of the vehicle, the travel track record including the stops and a departure time associated with each of the stops;
       for each of the stops:
          determine that a delay has occurred, based on the travel track record, when a departure time from the stop is later than a scheduled time for the stop;
          upon a determination that a delay has occurred, determine a cause of the delay to be departure delay so that the determination of the cause of the delay is made without reference to input from a driver of the vehicle or a driver of another vehicle; and
       output the determined cause of delay.

13. A computer-readable recording medium storing a computer-executable operation management program for managing a delivery vehicle that makes a plurality of delivery stops along a delivery route that, when executed, causes a computer to:
    obtain a travel plan for the delivery vehicle, the travel plan including a plurality of planned delivery stops and a scheduled time associated with each of the planned delivery stops;
    obtain a travel track record for the delivery vehicle showing travel progress of the delivery vehicle along the travel plan, the travel track record including the delivery stops and a travel time associated with each of the delivery stops, the delivery stops being the planned delivery stops for which the delivery vehicle has already stopped along the travel plan;
    for each of the delivery stops:
       determine whether a delay has occurred by referring to the scheduled time for the delivery stop and the travel time associated with the delivery stop;
       upon a determination that a delay has occurred for the delivery stop, determine the cause of the delay by referring to the scheduled time for the delivery stop with the travel time associated with the delivery stop so that the determination of the cause of the delay is made without reference to input from a driver of the delivery vehicle or a driver of another vehicle; and
    output the determined cause of the delay for the delivery stop.

14. A computer-readable recording medium storing a computer-executable operation management program for managing a vehicle that makes a plurality of stops along a route that, when executed, causes a computer to:
    obtain a travel track record including a plurality of stops of a vehicle and a travel time associated with each of the stops;
    obtain a travel track record for the vehicle showing travel progress of the vehicle, the travel track record including the stops and a departure time associated with each of the stops;
    for each of the stops:
       determine that a delay has occurred, based on the travel track record, when a departure time from the stop is later than a scheduled time for the stop;
       upon a determination that a delay has occurred, determine a cause of the delay to be departure delay so that the determination of the cause of the delay is made without reference to input from a driver of the vehicle or a driver of another vehicle; and
    output the determined cause of delay.

* * * * *